Patented July 17, 1923.

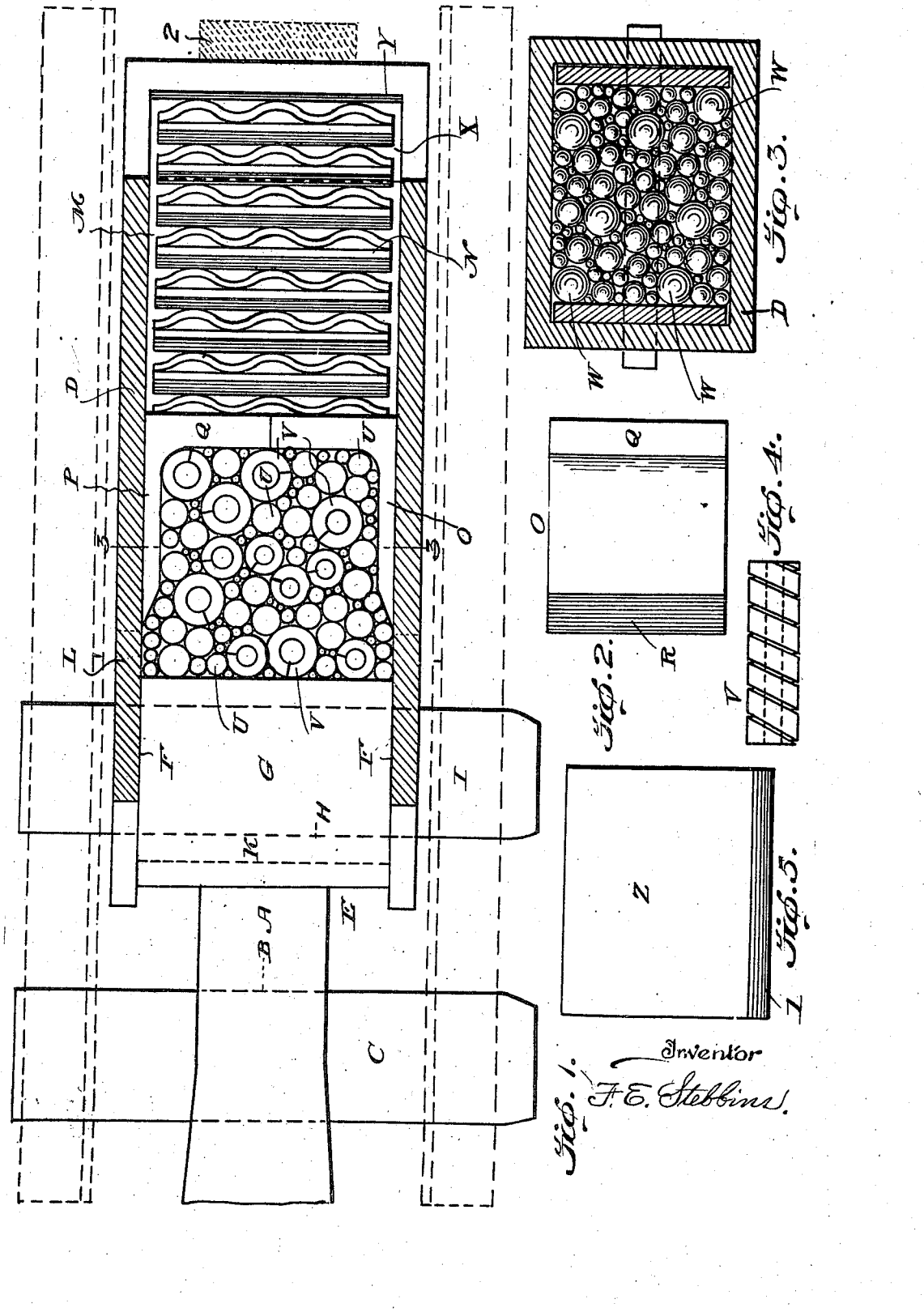

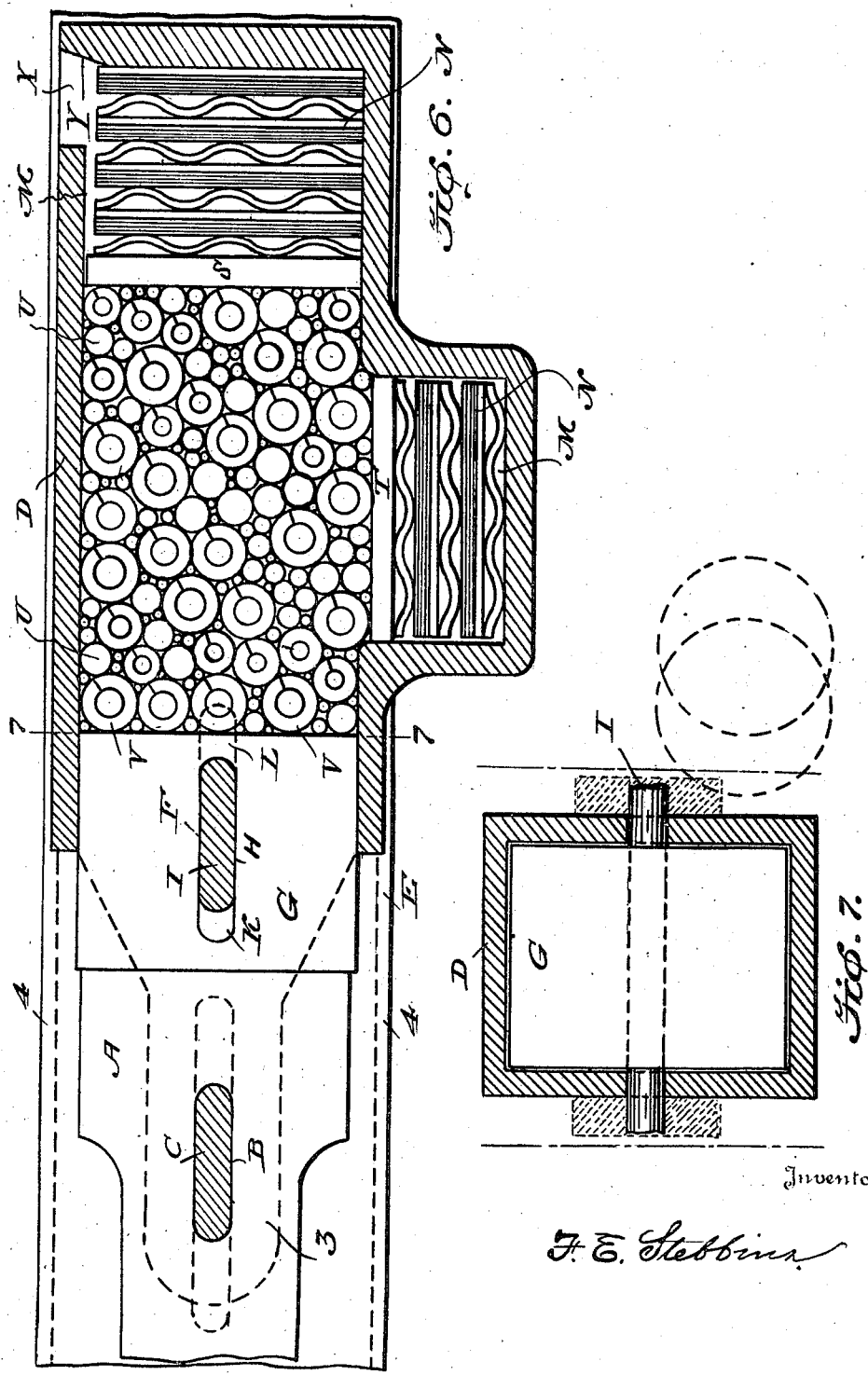

1,461,788

UNITED STATES PATENT OFFICE.

FRANK E. STEBBINS, OF WASHINGTON, DISTRICT OF COLUMBIA.

KINETIC-ENERGY-TRANSFORMING MEANS FOR CARS, BUMPERS, ETC.

Application filed March 20, 1920. Serial No. 367,482.

*To all whom it may concern:*

Be it known that I, FRANK E. STEBBINS, a citizen of the United States, residing at Washington, District of Columbia, have invented certain new and useful Improvements in Kinetic-Energy-Transforming Means for Cars, Bumpers, Etc.; and I do hereby declare the following to be a full, clear, and exact description of the invention, such as will enable others skilled in the art to which it appertains to make and use the same.

The invention relates to kinetic energy transforming means for cars, bumpers, or the like.

The object, stated in general terms, is the provision of means for transforming the energy of motion or kinetic energy of a car or cars into the work of moving a plurality of friction elements relative to each other or one another and an inclosing casing or housing, and, when desired, also compressing or deforming a spring or springs.

The invention consists in certain novelties of construction and in certain combinations and relative arrangements of parts as herein set forth and specified in the claims, some of which are as follows:

The combination with a casing and plunger one slidable relative to the other, of friction elements or bodies in a mass some or all of which are of greater length than thickness or diameter, or some or all of which are cylindrically shaped bodies preferably of different diameters in cross section, or some or all of the friction elements being each in itself yielding or elastic so it can change its shape under pressure or impact, or some or all of the elements being cylindrically shaped yielding or spring bodies. The friction elements are to be combined to form the mass so that the mass preferably will be mobile or become mobile under pressure and capable of changing its shape, and correspond in shape with the changed shape of the space within which the mass is confined when such shape is changeable in shape.

The combination with a casing and follower, as above mentioned, of slidable friction blocks, shoes or plates or a single such element, or other elements slidable relative to the casing or each other, and using a mobile mass of friction elements to press the said elements or element into frictional contact with one another or the casing.

Further, the invention consists in the provision of means for taking up lost motion, or compacting the friction elements constituting the mass, or the mass and spring means, so the normal length of the casing and follower or plunger substantially will be maintained.

The accompanying drawings illustrate several examples of the embodiment of the invention the parts being constructed and combined according to the best modes of procedure so far devised for the purpose.

Figure 1 is a top plan view of a coupler shank and key, a plunger and key, friction elements in mass, sliding friction plates or shoes, plate springs, and the front and rear ends of a metallic casing, the middle part of the casing being in horizontal section, the dotted lines indicating the draft sills or beams of channel shape.

Figure 2 is an elevation view of one of the two sliding friction blocks or shoes.

Figure 3 is a cross section of the metallic casing or housing taken on line 3—3, Figure 1, showing the friction shoes in section; also rigid metallic friction balls of different diameters within the casing and in mass which can be used in lieu of the cylindrically shaped bodies to force and hold the friction shoes or plates in contact with the casing under variations of pressure when the apparatus is in action.

Figure 4 shows one of the hollow yielding spring cylinders or rollers removed from the mass in Figure 1.

Figure 5 shows one of the bevel edged plates or blocks to be driven in the casing at the back of the spring plates to take up lost motion or to compact the mass of friction elements and spring plates.

Figure 6 is another example of the embodiment of the invention, the casing and keys being in vertical section and the spring plates, friction elements in mass, the plunger, and coupler butt in elevation.

Figure 7 is a cross section of the casing on line 7—7, Figure 6, showing the end of the plunger in elevation, also in dotted lines draft links or sides of a U-shaped yoke disposed in horizontal position and surrounding the casing.

The casing or housing is of cast metal, elastic cast steel preferably, so the casing can expand and contract changing the interior capacity of the same or the space inclosed, thus allowing relative displacement of some of the friction bodies or units of the mass under impact or pressure.

Referring to the parts common to the examples, A designates the coupler butt having a slot B through which passes a key C, as shown; D, the metallic casing having an open end E at the front and elongated slots F in the sides; G, the follower or plunger having a slot H through which and the slots F is passed a key I. The slot in the plunger is elongated at K to allow an initial movement of the plunger rearwardly, and the slots F are elongated at L to allow the key to move a limited distance rearwardly in buffing, and the casing to move a limited distance forwardly relative to the key in drawing. M are pockets at the rear end of each casing and at the bottom side in Figure 6 within which are spring means consisting in the present case of corrugated steel spring plates N the corrugations of one plate being at right angles to the corrugations of an adjacent plate in a well known way or arrangement.

At the front of the spring plates, Figure 1, are located sliding friction blocks, shoes or plates O, the sides P engaging the vertical sides of the casing and the parts Q matching at the center of the casing and bearing against the steel spring plates. They form a movable wall or follower extending across the entire interior cross sectional area of the casing, and each plate or shoe has at R a beveled edge. In Figures 6 and 7 loose integral follower plates S and T bear against the spring plates.

The frictional elements or bodies in mass located between the follower or plunger G and the combined series of spring plates N are substantially of the same construction in Figures 1 and 6. In the former figure they are disposed vertically and in the latter figure horizontally. These frictional elements shown are each of a cylindrical shape, the smaller ones U being rods or solid or rigid bars and the larger ones V being hollow cylinders, and each in itself being yielding or elastic and made, as shown by Figure 4, by coiling a rectangular metallic bar to form a helical spring of cylindrical shape and hollow.

Obviously, the mass of friction elements being arranged parallel and being of different diameters in cross section will form a mobile mass and can flow under pressure, somewhat like a fluid, in all directions in a plane at right angles to the lengths of the elements.

In Figure 3 there is illustrated a mobile mass of metallic friction elements W comprised mainly of rigid or solid balls of different diameters which may be used in place of the mass of cylindrically shaped elements to press outwardly or sideways the sliding friction blocks, shoes or plates, such, for example, as shown in Figures 1 and 2, or of different construction, against the interior surface or a side or sides or fixed part of the casing or housing.

The method of taking up lost motion or compacting the mass of friction elements or said elements and the spring means or plates and maintaining the normal length of the casing and plunger is as follows: The key I being in its extreme outward position, and the rear end of the casing having a top opening at X and the rear edge of the end wall being beveled at Y, relatively thin plates or blocks Z each with a beveled edge are driven inwardly back of the spring plates, which action forces the entire movable contents of the casing in the direction of the plunger. When the friction elements have become worn or the plates slightly flattened under use additional take-up plates may be inserted.

In Figure 1 the casing is moved forwardly by a yoke of well known construction passed over the casing, a cross section of such a yoke being shown by dotted lines 2. In the example shown by Figure 6 slotted arms integral with the casing may be present to draw the casing forwardly (see dotted lines 3) or a slotted U-shaped yoke or slotted links outside the casing (see dotted lines, Figure 7) may be adopted for the purpose. Dotted lines in Figure 1 show the relative locations of the draft beams or channels, and 4 in Figure 6 designates one of these beams.

The mode of operation will be understood by those skilled in the art. In the examples the casings or housings being suitably supported and held against rearward motions by stops, kinetic energy being transmitted by the coupler to the plunger the latter is moved rearwardly relative to the casing and the movable contents therein compressed. In drawing the casing is moved forwardly relative to the plunger and key I and the contents of the casing compressed in a similar manner under impact. The movements of the friction elements in a mobile mass relative to one another, the casing and the friction plates or shoes, which plates or shoes slide relative to the sides of the casing, and the bending and movements of the spring plates one relative to others, also the yieldings or deformations of the spring cylindrical elements, occasion percussions, vibrations, pressures, distortions and abrasions of the metallic contents within the casing, which transform the kinetic energy into work, or, in other words, induces physical changes in the contents of the casing and in the casing itself which approximately equal the kinetic energy transmitted by the moving car, it being understood that the moving car carries a duplicate apparatus which transforms part of the kinetic energy.

Any mobile mass of friction elements may be used, cylinders, balls, or metallic elements of other shapes to press the friction plates or blocks or shoes or a single plate or block against the interior surface of the casing or against another friction element which is movable with the mass or relative thereto. Small cylindrically shaped metallic bodies of the same diameter may form the mobile mass when of such diameters that they will move freely and not wedge or interlock, but those of different diameters are preferable.

The friction elements or bodies are preferably of greater length than thickness, some or all cylindrical, some or all cylindrical and inherently elastic, some or all cylindrical of the same diameter or of different diameters, all cylindrical and inherently elastic of approximately the same diameter, or some or all inherently elastic bodies of various shapes when their combination will form a mobile mass under pressure; and the mobile mass may consist of friction bodies some of greater length than thickness mixed or mingled with friction elements of other shapes. Cylinders of different diameters, and cylinders some or all of which are inherently elastic, form a mobile mass, or a mass which becomes mobile under pressure, and have been found satisfactory for the purpose intended.

What I claim is:

1. A friction draft or buffing apparatus comprising a housing structure, a plurality of friction bodies some being of greater length than thickness assembled to form a mobile mass located within said structure, and means whereby said friction bodies are allowed a relative movement under load or impact.

2. The subject-matter of claim 1 when some of said friction bodies are of different thicknesses or diameters.

3. The subject-matter of claim 1 when some of said friction bodies are of cylindrical shape.

4. The subject-matter of claim 1 when some of the friction bodies are inherently resilient or elastic.

5. The subject-matter of claim 1 when some of the friction elements are coiled springs.

6. The subject-matter of claim 1 when said housing is provided with a pocket the capacity of which is controlled by yielding or spring means.

7. The subject-matter of claim 1 when the housing is provided with a pocket and spring means within the pocket which can yield and allow movement of the friction bodies.

8. A friction draft or buffing apparatus comprising a housing structure substantially closed at the top and sides between the ends, a plurality of friction bodies some being of greater length than thickness assembled in a mobile mass located within the said inclosed portion of the housing, and means whereby said friction bodies are allowed a relative movement and a movement in mass lengthwise of the housing under load or impact.

9. A friction draft or buffing apparatus comprising a plurality of friction bodies some of which are of greater length than thickness assembled to form a mobile mass, a yieldable means co-operating with said bodies to resist a change in their assembled shape or form, and means also co-operating with said bodies to cause their changing their assembled shape or form against the resistance of said yieldable means under load.

10. The subject-matter of claim 9 when some of the friction elements consist of cylindrically shaped elements of different diameters.

11. A friction draft or buffing apparatus comprising a plurality of friction bodies some of which are of greater length than thickness assembled to form a mobile mass, and means capable of changing its form under load for housing said bodies to allow a corresponding change of the assembled form of said mobile mass.

12. A friction draft or buffing apparatus comprising a plurality of friction bodies some of them of greater length than thickness assembled to form a mobile mass, resilient means for resisting change of assembled form of said bodies, and means for holding said resilient means and friction bodies in their assembled relation.

13. A friction draft or buffing apparatus comprsing two members one of them having a chamber and one having a sliding movement relative to the other member, and a mobile mass of friction elements confined between said members some of said elements in the mass being by reason of their structural formation, elastic or yielding, whereby under impact said mass can change its shape and the elements occupy different relative positions and energy be transmitted to part of the interior surface area of the chamber.

14. A friction draft or buffing apparatus comprising two members one of them having a chamber and one of said members having a sliding movement relative to the other, and a plurality of elements in contactual mass confined between said members, some of said elements consisting of cylindrically shaped bodies and with their axes substantially at right angles to the longitudinal axis of the said two members, which, by reason of their structural formation, are elastic or yielding under pressure.

15. The subject-matter of claim 14 when said elements consist of spring cylinders arranged substantially parallel and other friction elements.

16. The combination in a draft or buffing apparatus, of a housing and plunger one slidable relative to the other, a plurality of cylindrically shaped bodies in contact within the housing some movable relative to others, and spring means normally resisting the movement of said bodies but yieldable under impact to permit relative movement of some of said cylindrical bodies.

17. A friction draft or buffing apparatus comprising a housing structure and a plunger one slidable relative to the other, a plurality of friction bodies forming a mobile mass within said housing, resilient means for resisting change of assembled shape of said bodies, and a sliding plate or shoe or block located between said housing and mobile mass.

18. A friction draft or buffing apparatus comprising a housing structure and a plunger one slidable relative to the other, a plurality of friction bodies forming a mobile mass within said housing, a sliding metallic element, and resilient means for resisting change of assembled shape of said bodies but allowing a sliding movement of said metallic element under increase of pressure.

19. A friction draft or buffing apparatus comprising a housing structure, a plurality of friction bodies forming a mobile mass, sliding metallic friction elements adapted to be moved by said friction bodies, resilient means for resisting movement of said mobile mass, and means co-operating with said housing whereby under load or impact the friction bodies press against the said sliding metallic friction elements and when the resilient means actuates occasions a sliding forward movement of said sliding metallic friction elements relative to a fixed part or parts of the housing structure.

20. The combination with a friction draft or buffing gear having spring means and a movable metallic friction element, of a mobile mass of friction bodies adapted under pressure to move said metallic friction element relative to another element of said apparatus and in opposition to the yielding pressure of the spring means.

21. In a draft or buffing apparatus having a housing, a yielding or spring member, and a slidable member movable relative to said housing and in opposition to said yielding or spring member, means for moving said slidable member into frictional contact with the housing comprising a mobile mass of friction elements capable of changing its shape under pressure or impact.

22. In a draft or buffing apparatus, in combination, a housing, friction shoes, yieldable means resisting the movement of the shoes, a plunger, and friction bodies assembled in a mobile mass between said shoes and the plunger.

23. Claim 22 when the yieldable means consists of metallic springs to resist the movements of the plunger and shoes.

24. Claim 22 with the addition of means for maintaining the mass of friction bodies and friction shoes and plunger in operative position.

25. A friction draft or buffing apparatus comprising, in combination, a hollow metallic casing with an open end and a plunger at the said open end one slidable relative to the other and thus forming a chamber of variable capacity, means for limiting the outward movement of the plunger relative to the casing, a mass of friction elements some of which are of greater length than thickness within the said chamber, and means for varying the degree of compactness of the said mass of elements between the casing and the plunger when said latter is in its extreme outward position.

26. Claim 25 when some of said elements consist of inherently yielding or spring bodies.

27. A friction draft gear or buffing apparatus comprising a casing, a follower movable in connection therewith, a plurality of movable metallic elements some of them substantially cylindrical in cross section and in contact and shiftable each relative to the other within said casing the axes of said cylindrical elements being disposed substantially at right angles to the axis of the casing, and spring means yieldably resisting the movement of said elements under impact.

28. A friction draft or buffing apparatus comprising a housing, a follower, a movable member formed in sections, said housing and member being arranged to slide over each other when in frictional contact, a plurality of friction bodies shaped and assembled to form a mobile mass arranged to bear against the sections of said member, and yieldable means adapted to resist movement of said movable member.

29. A friction draft or buffing apparatus comprising a housing structure, a plurality of friction bodies some of greater length than thickness shaped and assembled to form a mobile mass located within said structure, and pocketing means having a yieldable element to receive part of said mass under load.

30. A draft or buffing apparatus comprising in combination, a housing and a follower or plunger one movable relative to the other, a plurality of friction bodies within said housing, some of said bodies being cylindrical in shape and in contact and shiftable each relative to the other, and spring means adapted to yield under impact and allow movement of said friction bodies as a whole relative to the housing.

31. A friction draft or buffing apparatus comprising a housing structure, a plurality of friction elements in contact confined within said housing some of which elements are substantially rigid bodies and others of less rigidity, and yieldable means forming with the wall of said housing a substantially closed pocket of variable capacity, whereby under impact the capacity of the pocket will be diminished and the friction elements move under variation of pressure as a mobile mass.

In testimony whereof I affix my signature.

FRANK E. STEBBINS.